Feb. 19, 1963 C. H. HEUER ETAL 3,078,421

SYNCHRONIZING A SIGNAL GENERATOR BY UTILIZING VARIABLE FILTER IN CONTROL CIRCUIT

Filed Nov. 3, 1959

INVENTORS
John L. Rennick
Charles H. Heuer
BY Francis W. Crotty
ATTORNEY

United States Patent Office 3,078,421

Patented Feb. 19, 1963

3,078,421

SYNCHRONIZING A SIGNAL GENERATOR BY UTILIZING VARIABLE FILTER IN CONTROL CIRCUIT

Charles H. Heuer, Glencoe, and John L. Rennick, Elmwood Park, Ill., assignors to Zenith Radio Corporation, a corporation of Delaware Filed Nov. 3, 1959, Ser. No. 850,677
1 Claim. (Cl. 331—17)

This invention relates to synchronized signal generators, and particularly to a control circuit for controlling the effect of noise signals upon a signal generator of the kind comprising an oscillator which is controlled in phase and freqnency by a phase detector coupled thereto. Although the invention may be used in other applications, it is particularly advantageous as applied to a color reference signal generator for a color television receiver, and is described in that environment.

The color reference signal generator for a color television receiver usually comprises a color reference oscillator which develops a color reference signal employed to demodulate the chrominance signal components of a received composite color signal. A phase detector is coupled to the output of the oscillator. The color synchronizing signal included in the received color telecast is also applied to the phase detector, which develops a control signal representative of variations in phase and frequency between the color reference and color synchronizing signals. The output of the phase detector is applied to a reactance tube or other reactance device which is utilized to vary the phase and frequency of the reference signal generated by the oscillator. Usually, the coupling circuit between the phase detector and reactance tube comprises a relatively simple low pass filter.

A color reference signal generator of the kind described briefly hereinabove may present substantial problems in operation, particularly in those instances where the received signal is relatively weak. In order to achieve frequency synchronization between the color synchronizing signal and the reference signal generated by the oscillator, especially under weak signal conditions, it is highly desirable that the low pass filter have a relatively broad bandwidth. If the bandwidth of the filter is made relatively narrow, the A.C. components in the output of the phase detector are highly attenuated and the pull-in range for the reactance tube oscillator becomes relatively small. Thus, it may not be possible to achieve frequency synchronization if the filter bandwidth is made too narrow. On the other hand, if the pass band of the filter is relatively large, the effect of noise signals present in the output of the phase detector is substantially enhanced, and these noise signals may cause serious disturbances in phase synchronization of the oscillator and thus may prevent effective phase stabilization of the color reference signal relative to the received color synchronizing signal. Since the color values in the reproduced picture are dependent upon the phase relationship of the color reference signal with respect to the color synchronizing signal, the use of a filter having a relatively broad bandwidth in the coupling circuit between the phase detector and the color reference oscillator may interfere substantially with accurate reproduction of color values in the reproduced image.

Previously proposed systems have provided means for changing the characteristics of the filter circuit in accordance with the operating condition of the color reference oscillator. That is, means have been provided to determine when the oscillator is locked in frequency synchronism with the received color synchronizing signal. Systems of this kind also include some provision for modifying the bandwidth of the coupling filter, affording a relatively wide bandwidth whenever the color reference oscillator is not "locked in" in frequency but effectively narrowing the bandwidth as soon as frequency synchronism is achieved. Systems of this kind are substantially effective in overcoming the difficult and contradictory requirements with respect to the bandwidth characteristics of the filter required for good pull-in of the oscillator and for substantial immunity to noise. However, known systems of this kind have required the use of a phase detector or other relatively complex circuit for the sole purpose of controlling the filter characteristics and have, consequently, added substantially to the cost of color television receivers in which they are incorporated.

It is a primary object of the invention, therefore, to provide a new and improved coupling and control circuit for a synchronized signal generator of the kind including an oscillator controlled in phase and frequency by a phase detector which compares the output of the oscillator with a synchronizing signal.

A more specific object of the invention is to provide a control circuit for a synchronized signal generator, such as the color reference signal generator of a color television receiver, which affords two modes of operation corresponding to synchronous and asynchronous operation of the oscillator relative to a comparison signal, but which does not entail the use of a separate phase detector.

Another object of the invention is to modify the effective bandwidth of a control circuit, used to couple a phase detector to a control element of an oscillator, in response to the presence or absence of A.C. signal components in the output of the phase detector in order to protect the oscillator against noise signals without substantially reducing the pull-in range of the oscillator.

Another object of the invention is to change the operation of a coupling and control circuit, in a synchronized signal generator of the kind comprising an oscillator controlled by a phase detector, to provide for two-mode operation responsive to asynchronous or synchronous operation of the oscillator, relative to a received signal, by the simple addition of a single inexpensive switching device in a conventional filter circuit.

The features of the present invention which are believed to be novel are set forth with particularity in the appended claims. The organization and manner of operation of the invention, together with further objects and advantages thereof, may best be understood by reference to the following description taken in conjunction with the accompanying drawing, in which:

Figures 1, 2, 3:
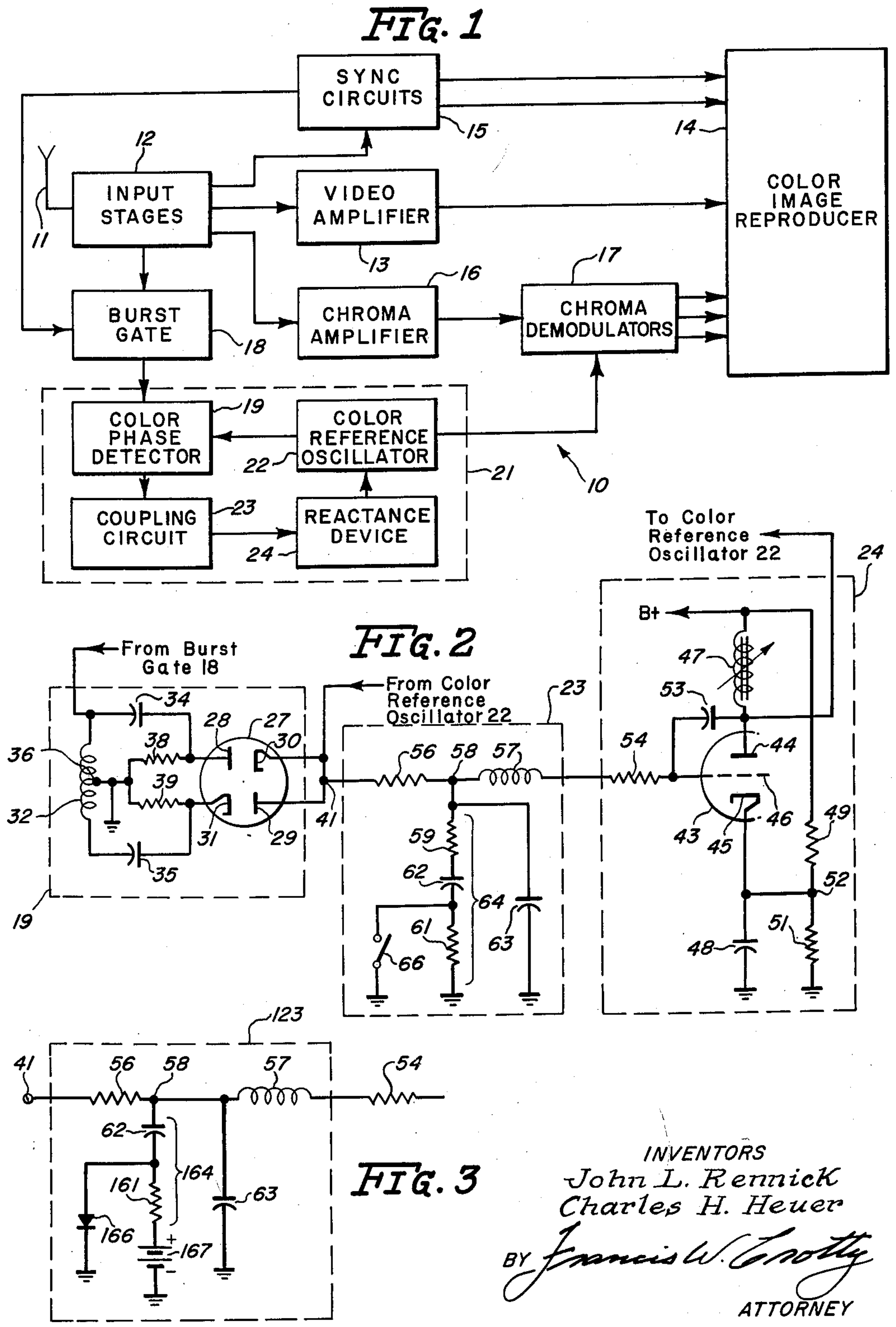
FIGURE 1 is a block diagram of a color television receiver, illustrating a color reference signal generator in which the present invention may be advantageously incorporated.
FIGURE 2 is a schematic diagram illustrating, in simplified form, one embodiment of the invention.
FIGURE 3 is a schematic diagram illustrating a preferred embodiment of the invention.

The color television receiver 10 illustrated in the block diagram of FIGURE 1 comprises an antenna 11 which is coupled to the input stages of the receiver, as indicated by the reference numeral 12. The input stage unit 12 may include, for example, a suitable tuner, one or more stages of radio frequency amplification, a first detector, an intermediate-frequency amplifier of one or more stages, and a second detector. If desired, two or more separate second detector stages may be employed in accordance with conventional practice. The output or second detector stage of unit 12 is coupled to a video amplifier 13, which comprises the luminance channel of receiver 10, the output stage of the video amplifier being coupled to a suitable color image reproducer 14. The receiver 10 further includes suitable synchronizing circuits 15, which may comprise the usual horizontal sweep signal generator and vertical sweep signal generator and appropriate synchronizing circuits for the sweep signal generators. The synchronizing circuits 15 are, of course, coupled to the second detector of unit 12, and the sweep signals generated by synchronizing circuits 15 are applied to image reproducer 14.

A suitable chrominance signal amplifier 16 is incorporated in the receiver 10, the input stage of the amplifier being coupled to unit 12. The output of the chrominance amplifier 16 is coupled to a chrominance demodulator system 17 in which the chrominance signal is demodulated to develop three color difference signals which are applied to color image reproducer 14.

The color reference signal required for demodulation of the received carrier color signal is generated by a reference signal generation system comprising a burst gate 18 which is coupled to the second detector of unit 12 and which is also coupled to the horizontal sweep signal generator in synchronizing circuits 15. The output of the burst gate 18 is coupled to a color automatic phase detector 19 which is incorporated in a color reference signal generator 21.

In addition to phase detector 19, color reference signal generator 21 includes a color reference oscillator 22 which is coupled to the phase detector and is also coupled to chrominance demodulators 17. The output of phase detector 19 is coupled through a coupling circuit 23, which is essentially a low pass filter, to a reactance device 24. The reactance device 24 may comprise a conventional vacuum tube, such as a triode, which is suitably coupled to color reference oscillator 22 to afford a means for varying the phase and frequency of the output signal from the oscillator in accordance with and in response to a signal applied to the reactance tube.

As thus far described, receiver 10 is substantially conventional in construction; accordingly, only a brief description of its operation is deemed necessary herein. A modulated carrier color television signal received by antenna 11 is applied to the input stages 12 of the receiver. In unit 12, the received signal is heterodyned with a locally generated signal to develop an intermediate-frequency signal which, in turn, is amplified and applied to the second detector stage or stages of the receiver. The output signal from unit 12 comprises a composite color signal including periodically recurring synchromizing-signal components and a color picture signal. The synchronizing-signal components, of course, include both scanning repetition-frequency information and a color sync signal in the form of color sync bursts having a frequency equal to the frequency of the color subcarrier and having a fixed phase relationship with respect to the color subcarrier.

That portion of the composite color signal generally corresponding to the luminance signal in the received telecast is amplified, in video amplifier 13, and applied to color image reproducer 14. In synchronizing circuits 15, the scanning-synchronization components of the received telecast are segregated and are utilized, in conventional manner, to develop suitable sweep signals which are applied to image reproducer 14 to control image scanning therein. A control signal is also derived from synchronizing circuits 15 and applied to burst gate 18. In this manner, the burst gate is controlled to pass only the color sync signal to color phase detector 19.

The phase detector 19 compares the received color sync signal with the output of oscillator 22 and generates a control signal representative of the phase and frequency relationship of the color sync and reference signals. This control signal is applied, through filter 23, to reactance tube circuit 24 to vary the phase and frequency of the output signal from oscillator 22 and maintain the oscillator in synchronism, with respect to both phase and frequency, with respect to the received color sync signals. The output signal from color reference oscillator 22 is applied to color demodulation system 17 and is used therein to demodulate the chrominance signal components of the received telecast. In the illustrated arrangement, the output from demodulating system 17 comprises three color difference signals which are applied to image reproducer 14 and are utilized therein, in conjunction with the luminance signal from amplifier 13, to control operation of the image reproducer. It should be understood that the illustrated control system for image reproducer 14 is not essential to the present invention and that the luminance and color difference signals may be combined, in a suitable matrix, to generate suitable chrominance signals for the control of image reproducer 14 if desired.

As noted hereinabove, the present invention is concerned primarily with the construction and operation of the control circuit coupling phase detector 19 to reactance tube circuit 24, and specifically with the construction and operation of coupling circuit 23. FIGURE 2 illustrates in substantial detail, the construction of color phase detector 19, coupling circuit 23, and reactance tube circuit 24, the particular filter circuit 23 shown in this figure constituting one embodiment of the present invention.

The phase detector 19, as shown in FIGURE 2, may comprise a dual diode 27 having a pair of anodes 28 and 29 which are associated with two cathodes 30 and 31, respectively. The input circuit for phase detector 19, from burst gate 18, comprises an inductance 32, the end terminals of the inductance being coupled to anode 28 and to cathode 31 by means of the capacitors 34 and 35, respectively. A center tap 36 on coil 32 is returned to a plane of reference potential, here indicated as ground. The anode 28 and cathode 31 are also returned to ground through load resistors 38 and 39, respectively. The anode 29 and cathode 30 are connected to each other and are coupled to color reference oscillator 22.

The phase detector 19 is substantially conventional in construction and operation. The input signal from burst gate 18, which comprises the color sync signal, is applied to anode 28 and cathode 31 in push-pull relation. A color reference signal derived from the output of color reference oscillator 22 is applied to anode 29 and to cathode 30 in push-push relation. Under normal conditions, with the color reference oscillator locked in phase and frequency to the received color sync signal, the signal applied to electrodes 29 and 30 is of the same frequency as that applied to electrodes 28 and 31, but is shifted 90° in phase with respect thereto. The output signal from phase detector 19, appearing at output terminal 41, varies in amplitude and polarity in accordance with deviations of the color reference signal from this relationship. The signal appearing at terminal 41 is essentially a variable D.C. signal. However, in those instances where the color reference signal is not synchronized in frequency with the color sync signal applied to the phase detector, the output signal appearing at terminal 41 also includes an A.C. signal or beat note having a frequency equal to the difference in frequencies of the two signals applied to the phase detector.

The reactance tube circuit 24 is also substantially conventional in construction and comprises a triode 43 having an anode 44, a cathode 45, and a control electrode 46. The anode 44 of the reactance tube is connected to a suitable source of D.C. operating potential, herein indicated as B+, through a frequency adjustment device comprising a variable inductor 47. The cathode 45 is effectively grounded for high frequency signals by means of a capacitor 48. The D.C. operating potential of the cathode is determined by a voltage divider comprising a pair of resistors 49 and 51 connected in series with each other between the B+ supply and ground, cathode 45 being connected to the center terminal 52 of the voltage divider. A fixed capacitor 53 is connected between control electrode 46 and anode 44, and the anode is also coupled to color reference oscillator 22.

In operation, reactance tube circuit 24 functions as a variable reactance in the frequency-determining circuit of the color reference oscillator. That is, a signal applied to the control electrode 46 of tube 43, through a coupling resistor 54, modifies the effective capacitance of the circuit from an initial value determined primarily by capacitor 53. The circuit 24 is conventional in construction and operation and may be coupled to oscillator 22 in known manner to achieve the desired variation in reactance in the frequency-determining circuit of the oscillator. The oscillator 22 itself may be of known construction and may be of the type including a frequency-determining crystal to afford the stable operation required in the color reference signal generator of a color television receiver. Thus, color reference oscillator 22 operates within a narrow frequency range, the ultimate frequency and phase of the signal generated by the oscillator being determined by variations in the effective reactance of circuit 24.

The coupling and control circuit 23, which is essentially a low-pass filter, includes a series impedance which is connected between output terminal 41 of phase detector 19 and the input of reactance device 24, in this instance input resistor 54. The series impedance of filter 23, in the illustrated embodiment, comprises a resistor 56. A choke coil 57 is also preferably connected in series with resistor 56 to prevent transmission of color reference frequency signals back to phase detector circuit 19.

The filter circuit 23 further includes a shunt impedance coupling one terminal 58 of series impedance 56 to a plane of reference potential, here indicated as ground. The shunt impedance in the embodiment of FIGURE 2, comprises two resistors 59 and 61 connected in series with a capacitor 62 between terminal 58 and ground. In addition, a bypass capacitor 63 may be connected in parallel with the shunt impedance, which is generally indicated by reference numeral 64, to afford a bypass for color carrier frequency signals.

In general, coupling circuit 23, as thus far described, is similar to filter circuits previously employed in color television receivers to couple color phase detector 19 to reactance device 24. The circuit 23 is essentially a low-pass filter, the bandwidth which is determined to some extent by the relative resistances in the series and shunt branches of the filter. Thus, if resistor 56 is approximately equal to or only slightly larger than the combined resistance presented by resistors 59 and 61, the effective bandwidth of the filter circuit is relatively broad, providing for good pull-in characteristics with respect to synchronization of the oscillator, in frequency, with the color sync signal. On the other hand, with the filter circuit constructed in this manner, noise signals present in the system are transmitted without adequate attenuation to reactance device 24, and may cause substantial variations in the phase of the color reference signal relative to the color sync signal, with the result that color values in the reproduced image are not stabilized as they should be.

The filter 23 may also be constructed with resistor 56 substantally larger than the combined resistance of resistors 59 and 61. When this is the case, the effective bandwidth of filter and coupling circuit 23 is relatively narrow, as compared with a construction in which the series and shunt resistances are relatively close in value. This reduction in bandwidth provides for improved performance with respect to noise, the noise signals being attenuated in the filter to a greater extent and hence not having the same undesirable effect upon operation of the color reference oscillator. Unfortunately, however, under these circumstances, the control system affords generally poor pull-in characteristics, where the oscillator is not initially locked in frequency synchronism with respect to the color sync signal. Under weak signal conditions, particularly, it may not be possible to obtain the necessary frequency synchronization of the colors reference oscillator.

This difficulty is effectively and inexpensively overcome, in the embodiment of FIGURE 2, simply by incorporating a switch 66 in the circuit in parallel with resistor 61, between the junction of resistor 61 with capacitor 62 and ground. The resistor 61 is made approximately equal in resistance to resistor 56, or may be made larger than resistor 56, whereas resistor 59 is made very much smaller than the series resistor and may even be eliminated entirely.

When color receiver 10 is first placed in operation, and during the initial warm-up period, switch 66 is left open. Under these circumstances, the effective bandwidth of filter 23 is relatively large, providing for effective pull-in of oscillator 22 into synchronism with the received color sync signals. Once synchronism is achieved, which is readily ascertainable because the color values in the reproduced image become markedly more stable than when the color reference frequency is different from the received color sync signal, switch 66 is closed. With switch 66 closed, resistor 61 is effectively bypassed, and the only effective shunt resistance is the relatively small resistor 59. Accordingly, the effective bandwith of coupling and filter circuit 23 is reduced substantially, with the result that noise signals are attenuated to a much greater extent than with the switch open. In normal operation, therefore, switch 66 is maintained closed in order to prevent noise signals from disturbing the phase relationship of the color reference signal, developed by oscillator 22, relative to the received color sync signals. Since the oscillator has already been effectively synchonized with the received color sync signal, with respect to frequency, and tends to remain in synchronization, the reduction in bandwidth does not adversely affect operation of the receiver, despite the fact that narrowing of the effective bandwidth of the filter reduces the pull-in range of the color reference generator.

Although the embodiment of FIGURE 2, comprising specfically coupling and control circuit 23, affords substantial advantages as compared with previously known arrangements, it is dependent to a substantial extent upon operation of the television receiver by the viewer. Thus, if switch 66 is left open, after frequency synchronization of the oscillator is effected, noise signals may cause substantial disturbances in operation of the color reference generator, particularly under weak signal conditions of reception. Furthermore, if the receiver is located in a fringe reception area and the receiver is switched from one channel to another, it may be necessary to open switch 66 each time there is a change in channels and to close it, thereafter, when frequency synchronization of the color reference oscillator is achieved. This necessity for relatively frequent actuation of switch 66 may be considered inconvenient and undesirable by users of the television receiver and may result in suboptimum performance of the receiver if the user does not understand the use of the switch.

FIGURE 3 illustrates a preferred embodiment of the invention, in the form of a coupling and control circuit 123, which provides for automatic two-mode operation which is substantially similar to the two-mode operation aciheved in circuit 23 by means of switch 66. Only the coupling and control circuit is shown in FIGURE 3, and it may be assumed that this circuit is connected to phase detector 19 and reactance device 24 in exactly the same manner as described hereinabove in connection with circuit 23 of FIGURE 2. Furthermore, many of the components of circuit 123 may be substantially the same as those of circuit 23. Thus, circuit 123 includes series resistance 56, connected between terminal 41 and resistor 54, and choke coil 57 may be connected in series between resistors 56 and 54. As before, the circuit includes a high-frequency bypass capacitor 63 which is returned to a plane of reference potential, here shown as ground.

The shunt impedance 164 of filter circuit 123, however, is slightly different from that of circuit 23. In this instance, the entire resistance of the shunt impedance appears as a single resistor 161 connected in series with capacitor 62. Instead of switch 66, the preferred circuit includes a diode 166 which is connected in parallel with shunt resistor 161, the anode of diode 166 being connected to the junction of capacitor 62 and resistor 161; the cathode of diode 166 is returned to ground. In addition, resistor 161 is not returned directly to ground. Instead, the shunt impedance of the filter circuit is connected to a bias source, illustrated by a battery 167, which is utilized to afford a relatively small forward bias to diode 166.

As noted hereinabove, when color television receiver 10 is first placed in operation, color reference oscillator 22 is usually not synchronized in frequency with the received color sync signal. Under these conditions, an A.C. signal or beat note of substantial amplitude appears at terminal 41, and hence at terminal 58 in coupling circuit 123. This A.C. signal, of course, is applied to diode 166, and is rectified by the diode. Rectification of the beat note signal effectively self-biases diode 166 so that forward current through the diode is reduced substantially and the effective impedance of the diode is increased to a marked extent. Actually, the impedance of the diode circuit may change from a normal value of a few thousand ohms to a megohm or more as the result of this self-biasing action.

When oscillator 22 achieves synchronization, in frequency, with the color sync signal, the A.C. signal for beat note representative of asynchronous operation of the oscillator no longer appears at terminal 41. Consequently, diode 166 becomes relatively highly conductive, since the A.C. signal forming the basis for the above-noted self-biasing effect is no longer present and because the diode is normally biased toward conduction by the bias source represented by battery 167. Under these circumstances, diode 166 affords an effective bypass for resistor 161 and reduces the resistance of shunt impedance 164 to a negligible value as compared with series resistance 56 of the coupling and filtering circuit. It is thus seen that the shunt resistance of the filter circuit may be made equal to or larger than the series resistance, during asynchronous operation with respect to frequency, but is automatically reduced to a negligible value as compared with the series resistance in response to locking in of the control oscillator. Accordingly, diode 166 automatically performs all of the functions of switch 66, and does not require any attention from the user of the receiver. Furthermore, this automatic two-mode operation effect is achieved, in circuit 123, without requiring a separate phase detector and the other complex circuit elements utilized for the same general purpose in previously known devices.

In order to afford complete illustration of the present invention, certain data are set forth hereinafter with respect to the individual components of the preferred embodiment of FIGURE 3. In general, these circuit values are equally applicable to circuit 23 of FIGURE 2 if it is considered that the total impedance of resistors 59 and 61, in that embodiment, are essentially the same as the resistance of resistor 161 in FIGURE 3. It should be understood that this material is presented solely by way of illustration and in no sense as a limitation on the invention.

| Device: | Rating or type |
|---|---|
| Dual diode 27 | 6AL5. |
| Triode 43 | ½ 6EA8. |
| Diode 166 | 1 N 34. |
| Resistor 54 | 2200 ohms. |
| Resistor 56 | 2.2 megohms. |
| Resistor 161 | 2.2 megohms. |
| Capacitor 62 | 0.1 microfarad. |
| Capacitor 63 | 0.001 microfarad. |
| Choke 57 | 42 microhenries. |

The pull-in characteristics of the preferred embodiment of FIGURE 3 have been found to be even better than those of a comparable circuit specifically constructed to afford good pull-in characteristics without protecting the system against disruption against noise signals. Relative pull-in ranges for the circuit of FIGURE 3 for various signal levels are set forth hereinafter, in direct comparison with a circuit identical with that of FIGURE 3 except for a reduction in resistance of resistor 161 to a value of 82 kilohms, and of course, elimination of diode 166.

*Pull-In Ranges*

[in multiples of 60 cycles]

| Signal level | Dual-mode (circuit 123) | Single-mode (no switch) |
|---|---|---|
| Down 10 db | 6 (fast) | 4 (slow) |
| Down 30 db | 6 | 4 (slower) |
| Down 40 db | 4 | 2 |
| Down 46 db | 2 (slow) | 1 (fair) |

As shown by these data, the preferred embodiment of the invention affords even better pull-in characteristics than a conventional filter circuit specifically constructed to afford optimum pull-in range with a minimum of protection against noise disturbances. Moreover, the performance of circuit 123 with respect to noise was very much improved as compared with the prior art circuit.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

In a synchronized signal generator of the kind including an oscillator for generating a reference signal, a phase detector, coupled to said oscillator and to a source of synchronizing signals, for developing a control signal representative of variations in phase and frequency between said reference and synchronizing signals, and a reactance device coupled to said oscillator to vary the phase and frequency of said reference signal in response to an applied signal, a control circuit comprising: a series impedance connected between the output of said phase detector and said reactance device; a shunt impedance, comprising a resistance and a capacitance in series with each other, connecting one terminal of said series impedance to a plane of reference potential, said shunt and series impedances conjointly affording a low-pass filter coupling said phase detector to said reactance device, said filter having a predetermined effective bandwidth affording a relatively high pull-in range for said oscillator; and a switching device, comprising a diode connected in parallel with at least a portion of said shunt resistance, and biasing means for maintaining said diode conductive except in the presence of a substantial A.C. signal component in said control signal, for automatically reducing the effective bandwidth of said filter by shunting said portion of said shunt resistance when said reference and synchronizing signals are synchronized in frequency to reduce the effect of noise signals on the operation of said oscillator.

References Cited in the file of this patent

UNITED STATES PATENTS

| | | |
|---|---|---|
| 2,828,419 | Gruen | Mar. 25, 1958 |
| 2,848,537 | Richman | Aug. 19, 1958 |
| 2,912,651 | Leeds | Nov. 10, 1959 |
| 2,932,793 | Smith et al. | Apr. 12, 1960 |

FOREIGN PATENTS

| | | |
|---|---|---|
| 637,380 | Great Britain | May 17, 1950 |